UNITED STATES PATENT OFFICE.

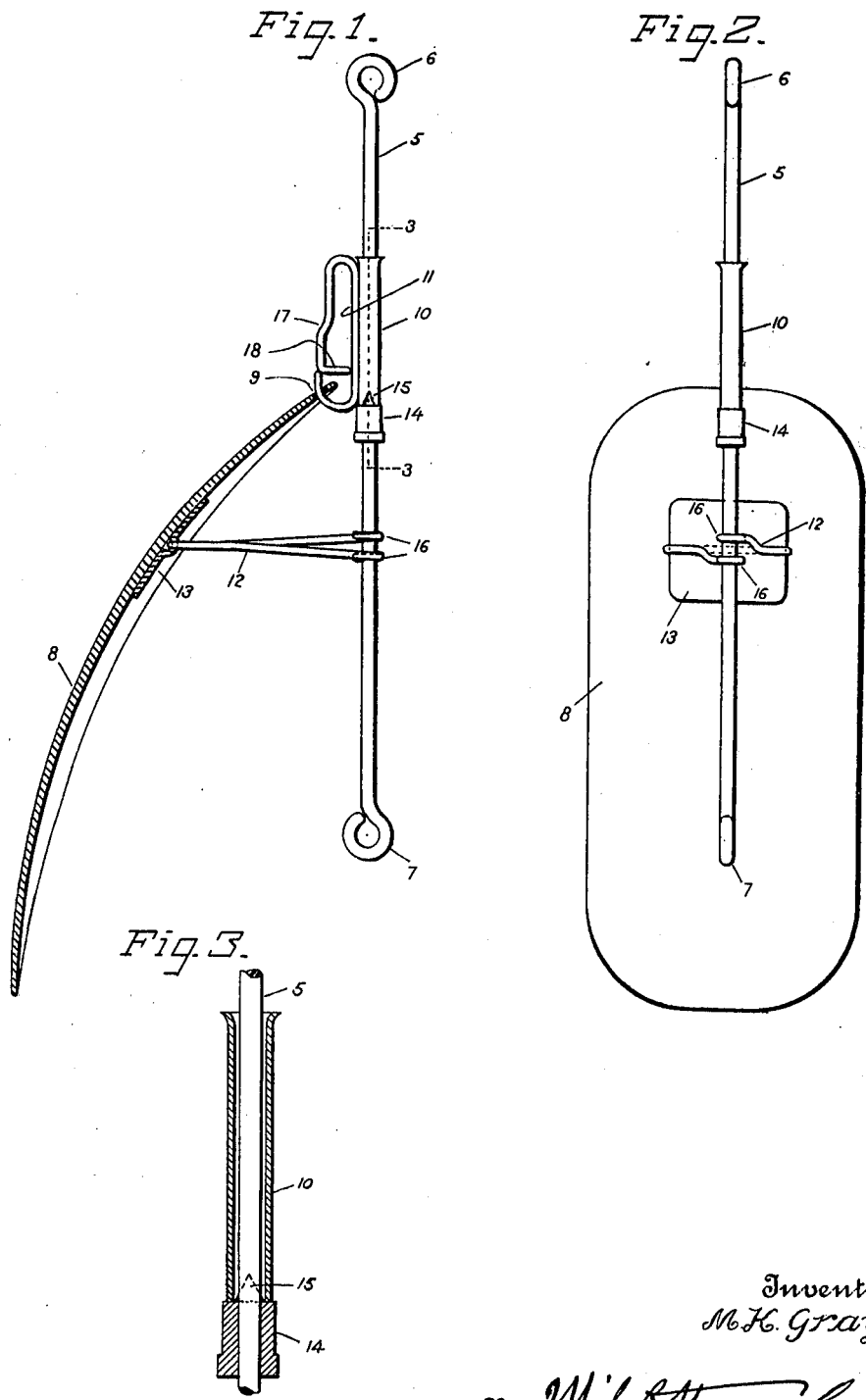

MATTHIAS K. GRAY, OF SAN FRANCISCO, CALIFORNIA.

ARTIFICIAL FISH-BAIT.

1,314,868.  Specification of Letters Patent.  Patented Sept. 2, 1919.

Application filed April 2, 1919. Serial No. 286,868.

*To all whom it may concern:*

Be it known that I, MATTHIAS K. GRAY, a citizen of the United States, residing at San Francisco, in the county of San Francisco and State of California, have invented new and useful Improvements in Artificial Fish-Baits, of which the following is a specification.

This invention relates to artificial fish baits or lures commonly known as spoons or spinners, and its object is to provide a simple and efficient structure by which the spoon is made readily interchangeable, and also to provide a novel and improved connection between the spoon and the shank of the device whereby the spoon is permitted to rotate or spin freely around the shank without twisting the line to which the latter is attached.

The objects stated are attained by means of a combination and arrangement of parts to be hereinafter described and claimed, and in order that the same may be better understood, reference is had to the accompanying drawing forming a part of this specification.

In the drawing,

Figures 1 and 2 are elevations of the device viewed from different sides, Fig. 1 being partly in section, and Fig. 3 is an enlarged sectional detail on the line 3—3 of Fig. 1.

Referring specifically to the drawing, 5 denotes the shank of the bait, the same being a wire having eyes 6 and 7, respectively at its ends, the upper eye being for attachment of the line and the lower eye for attachment of a hook.

The spoon 8 is of conventional shape and has at its inner end an aperture 9. The shank 5 carries a sleeve 10 which is provided with a device 11 similar to a snap-hook to which the spoon is attached by passing the hook through the aperture 9, these parts therefore providing a simple and convenient means for detachably connecting the upper end of the spoon to the shank. The spoon is pivotally supported as the hook of the device 11 is loose in the aperture 9, and as the sleeve 10 is free to rotate on the shank, the spoon can also freely revolve or spin around the latter. The outward swinging movement of the spoon relative to the shank is limited by a link 12 which is pivotally connected to the under side of the spoon by a bearing plate 13. This link is also detachably connected to the shank 5, and as the spoon is also detachably connected to the sleeve 10 by the device 11, the spoon can be easily removed without removing the shank 5 from the line, for attachment of a different spoon of any desired shape, color or material. When the fish strikes, the spoon folds against the shank, leaving the hooks only in the mouth of the fish so that they may be more readily extracted.

In order to limit the downward movement of the sleeve 10 on the shank 5, and thus maintain the top of the spoon a given distance from the lower end of the shank, the latter has a collar 14 on which the bottom of the sleeve abuts, the collar being fast on the shank.

The inside diameter of the sleeve 10 is such that there is enough space between the same and the shank 5 to permit the passage of water, thereby forming a water cushion which minimizes friction. In order to facilitate the entry of water into the sleeve, its upper end $10^a$ is flared or funnel-shaped. Egress of water from the sleeve is facilitated by having its lower end which seats against the abutment 14 formed with V-shaped notches 15 the same providing side outlets for the water in the sleeve. It will therefore be seen that the water flows freely through the sleeve when the device is drawn through the water, and the sleeve is prevented from binding or sticking on the shank. The link 12 also fits loosely around the shank 5, and it will therefore be evident that the spoon 8 is left perfectly free to spin or revolve around the shank with a minimum friction to prevent twisting of the line. The link 12 acts as a governor to limit the outward swing of the spoon, but as it loosely straddles the shank, the spoon can freely swing back and forth to throw flashes in all directions.

That portion of the link 12 which straddles the shank 5 is divided to form a pair of oppositely presented hooks 16 and the sides of the link are spread laterally to bring the hooks in superposed and spaced relation. The link can therefore be readily disengaged from the shank by first disconnecting the spoon 8 from the fastener 11, and then holding the shank clear of the hooks 16 and turning the spoon over to one side to bring the shank between the spread sides of the link clear of the hooks. The hooks now no longer encircle the shank, allowing separation of the latter from the link. To replace the spoon, it is necessary only to repeat this operation in a reverse order.

The hook portion of the fastener 11 which passes through the aperture 9 in the spoon 8 is closed by a spring tongue 17 to prevent the spoon from slipping off said hook, and to further guard against this, the spring tongue has an inward bend 18 across the hook completely closing up the same and also preventing the spoon from sliding up and binding on the tongue 17. The hook can be made slightly resilient so that it may be flexed to enable the spoon to clear the part 18 when it is to be slipped off the hook; or the part 17 can be made resilient so that it may be forced sidewise sufficiently to locate the part 18 clear of the hook.

I claim:

1. A spoon bait comprising a shank, a sleeve rotatably mounted on the shank and having an internal diameter which is greater than the diameter of the shank to provide a water passageway through the sleeve, the forward end of the sleeve being flared and its rear end having water outlets, a stop on the shank against which the rear end of the sleeve seats, a spoon connected to the sleeve, and a loose connection between the spoon and the shank to limit the outward swing of the former.

2. A spoon bait comprising a shank, a sleeve rotatably mounted on the shank and having an internal diameter which is greater than the diameter of the shank to provide a water passageway through the sleeve, the rear end of the sleeve having water outlets, a stop on the shank against which said rear end of the sleeve seats, a spoon connected to the sleeve, and a loose connection between the spoon and the shank to limit the outward swing of the former.

In testimony whereof I affix my signature.

MATTHIAS K. GRAY.

Copies of this patent may be obtained for five cents each, by addressing the "Commissioner of Patents, Washington, D. C."